United States Patent Office 3,540,868
Patented Nov. 17, 1970

3,540,868
CONTROL OF CARBON DEPOSITION IN CATALYST BEDS
Alexander Chevion, Livingston, and Raul Chao, East Orange, N.J., assignors to Esso Research and Engineering Company, a corporation of Delaware
No Drawing. Filed Dec. 29, 1967, Ser. No. 694,361
Int. Cl. C01b *2/14;* G01r *27/02;* G01n *27/04*
U.S. Cl. 48—214      9 Claims

ABSTRACT OF THE DISCLOSURE

Carbon formation in catalyst beds is monitored by measuring electrical resistance across one or more catalyst pellets. The invention is especially useful in steam reforming processes.

BACKGROUND OF THE INVENTION

This invention relates to a method and means for monitoring carbon deposition in catalytic beds. More particularly, it relates to methods and means for determining the extent of carbon deposition in catalyst beds and, in some instances, for the control or removal of carbon from such beds.

There are many processes in which hydrocarbons or other carbon-containing chemicals are passed through beds of catalyst particles and undergo reaction therein. Typical of these processes are the steam reforming, town gas manufacturing, and hydrogen generation processes. In a typical steam reforming process, a hydrocarbon such as petroleum naphtha, gas oils, natural gas, methane, etc. is mixed with water or steam and passed through tubes containing reforming catalyst at high temperatures. The hydrocarbon and steam react e.g., in the case of methane, according to the following reaction:

$$CH_4 + H_2O \rightarrow 3H_2 + CO$$

Various types of catalyst are used in processes in which hydrocarbons or other carbonaceous reactants are employed. Typical catalysts include nickel or nickel-alumina or nickel-silica compositions in pelletized forms. Various alkali metal, alkaline earth metal, or rare earth promoters are often also used in such catalysts.

A major problem in many such processes is the deposition of carbon on the catalysts. Thus, for example, an effective catalyst normally has very high surface areas, e.g. as high as 200 $m.^2/g.$, available in the pores and small voids within the pellets. The deposition of carbon even in very small amounts often has a severe effect upon the activity of the catalyst. For example, when even a fraction of a percent of carbon, based on the weight of the catalyst, is deposited on the surface of the catalyst, severe deactivation may occur.

Numerous methods have been considered for preventing carbon deposition. However, none have been entirely satisfactory. The most common technique for preventing carbon deposition on catalysts is to use very large molar ratios of steam-to-hydrocarbon in the feed.

When low ratios of steam-to-hydrocarbon are used, the catalyst beds are carefully monitored by measuring the pressure drop across the bed. When carbon builds up on the catalyst, the pressure drop across the bed increases. Unfortunately, this method is relatively insensitive and is completely ineffective in detecting carbon formation in the early stages because the pressure drop fluctuates for other reasons than carbon formation, e.g., minor flow variations or dusting of the catalyst. By the time pressure drop readings indicate that carbon has formed on the catalyst surfaces and in the pores, it is often too late to correct the situation. When excessive carbon has formed, the catalyst deteriorates, and even though the carbon is subsequently removed, the catalyst may be permanently deactivated.

Even when it is determined that catalyst deposition has occurred before permanent damage to the catalyst has been done, the consequences may still be very costly. For example, once carbon has deposited upon the catalyst surfaces, the catalytic effect is greatly reduced and the product gases may be of compositions far different from these desired. Furthermore, it may be necessary to remove the catalyst from the reactor to treat it for carbon removal. Thus, it has long been felt desirable to devise a method and means for determining when carbon is forming on a catalyst even before there is any noticeable effect on catalyst activity. After such determination it would be possible to adjust the steam to hydrocarbon ratio of the feed upwardly to oxidize any carbon already deposited and to prevent any additional carbon deposition.

SUMMARY OF THE INVENTION

These and other objects can be achieved in accordance with the present invention which contemplates a method and means for determining when carbon deposition is occurring in a catalyst bed. Further, the invention contemplates a means for correcting automatically the water-to-hydrocarbon ratio to alleviate the effects of such carbon deposition.

In accordance with the invention, the electrical resistance of the catalyst is continuously monitored to detect any change in the resistance due to carbon deposition. The technique is thus applicable to any catalysts which are essentially nonconductors. Thus, the resistance (or conductance) of the catalyst bed is continuously monitored by positioning electrodes at points across the bed or across a single pellet in the bed. The electrodes are attached to a source of electrical power and a device for measuring the conductance or resistance of the circuit, e.g., an ohm meter. Electrical potential is then applied to the electrodes and the resistance or conductance through the material separating the electrodes is measured.

When typical nickel, or nickel/alumina, or nickel/silica catalysts are employed, and the electrodes are attached to different points on a single catalyst pellet, resistances as measured on fresh catalyst are high. When the catalyst is in use in a reforming process and even a very slight amount of carbon is deposited on it, the carbon, being a good conductor, rapidly lowers the electrical resistance of the pellets. The monitoring instrument thus immediately indicates the presence of the carbon.

As soon as there is indication of carbon deposition on the catalyst, corrective action can be taken, either manually or automatically. For example, in a catalytic steam reforming process, the steam-to-hydrocarbon ratio can be increased either by lowering the hydrocarbon feed rate or increasing the steam feed rate and then continuing to monitor the catalyst conductivity to determine when the carbon has been removed.

In a particularly preferred operation in accordance with the present invention, the increased current flow through the monitoring circuit is used as a signal to a conventional flow controller to make a corresponding increase in steam feed rate (or decrease in hydrocarbon feed rate), thereby automatically correcting for carbon formation. As soon as the carbon has been removed and the catalyst conductivity has decreased such that the current flow through the monitoring circuit has decreased, the flow controller responds to the lower signal and decreases the steam feed rate (or increases the hydrocarbon feed rate), thereby lowering the steam-to-hydrocarbon ratio again. In this manner, by proper selection of instrument settings, the method or technique employed in accordance with this invention can be used to seek out the minimum or optimum steam-to-hydrocarbon ratio under any particular set of conditions, i.e., types of feed and catalysts, temperatures, pressures, flow rates, catalyst activities, etc.

DESCRIPTION OF THE PREFERRED EMMBODIMENT

The invention may be better understood by reference to the following example.

A 3¼ inch I.D. stainless steel tube is partially filled with ¾″ Raschig rings of a commercial nickel-alumina steam reforming catalyst containing about 25% nickel. A section of the tube approximately 30 feet long is filled with the actalyst rings. A mixture of propane and steam is preheated and introduced into the tube, which is heated in a furnace to maintain temperatures of about 1400° F. throughout the tube and to supply heat for the endothermic reforming reaction. Initially, the steam/carbon molar ratio is maintained at about 5.5.

The propane and steam react to form a gaseous product consisting principally of hydrogen, carbon monoxide, and carbon dioxide with a small amount of methane.

In the center of the catalyst bed a single Raschig ring of catalyst is equipped with stainless steel electrodes, i.e., stainless steel wire leads are wrapped around and tied at each end of the Raschig ring. The leads are insulated with ceramic rings and extend out of the tube to a 1½ volt D.C. battery and ohm meter to complete a monitoring circuit. Initially, the resistance in the circuit measures 15.5 ohms.

The steam/carbon ratio is reduced step-wise to about 3.2 and no change is detected in the circuit resistance. However, when the steam/carbon ratio is dropped to about 2.2, there is a very sharp and rapid decline in resistance down to about 11 ohms, indicating deposition of carbon on the catalyst between the wires on the monitoring Raschig ring.

The steam rate is increased to provide a steam/carbon ratio of about 4.0 and this ratio is held for about two hours, during which time the deposited carbon is oxidized from the surface of the catalyst as indicated by a rapid increase in resistance in the monitoring circuit back up to about 15.5 ohms.

The steam/carbon molar ratio in the feed is then set at about 2.9 by lowering the steam rate and again a sharp drop in resistance is observed down to about 14 ohms within a very short period of time less than about one hour. Again, the steam rate is increased to provide a steam/carbon ratio of about 4.0 and again the deposited carbon is rapidly removed, thereby again increasing the resistance in the monitoring circuit to about 15.5 ohms.

The steam rate is lowered still again, this time to provide a steam/carbon molar ratio of about 3.1. At this setting no carbon is deposited, as indicated by a constant circuit resistance.

One of the very significant features of applicants' invention is that it makes possible the detection of carbon formation at a very early stage. For example, the resistance drops appreciably even before the activity of the catalyst due to the deposited carbon has decreased a sufficient amount to significantly change the composition of the product gases. Thus applicants' invention makes possible, for the first time, a means for detecting carbon formation in catalysts before the catalyst is permanently damaged and before the process has deviated significantly from specification production.

Many variations are possible in the particular type of apparatus used in accordance with applicants' invention, and it is not intended that the scope of the invention be limited to any particular design of apparatus. For example, it is possible to use a probe housing a single or multiple pieces of catalyst with more sophisticated means of attaching electrodes to the catalyst than described above. Thus it is possible to form catalyst pellets or rings with electrodes imbedded beneath the surface of the catalyst. Also, it is possible to merely insert an electrode in the bed of catalyst, e.g., extending the full length of the tube housing the catalyst, and to then measure the resistance between such linear electrode and the walls of the tube. This technique is often particularly desirable in that it detects carbon formation at any point in the full length of the bed. However, such technique is much less sensitive and responds slower than measurement across a single pellet or ring of catalyst.

Many other variations will be apparent to one skilled in the art, and it is not intended that the invention be limited by the examples described, but that the full scope of the invention be given to the attached claims.

What is claimed is:

1. A method of controlling a process involving reaction of carbonaceous materials in the presence of a main bed of catalyst having high electrical resistances to detect carbon formation on said catalyst without having to remove sample from said bed which comprises:
    (a) continually imposing an electrical potential across said catalyst in said bed;
    (b) ascertaining any changes in the electrical resistance of said catalyst; and
    (c) adjusting said reaction in response to said changes to remove any accumulated carbon.

2. The method of claim 1 wherein said catalyst is contained in a tube of electrically conductive metal and an electrode is positioned within said bed of catalyst out of contact with the tube and said electrical resistance is monitored between said electrode and a wall of the tube.

3. The method of claim 2 wherein the electrode extends lengthwise through the tube amidst the bed of catalyst.

4. The method of claim 3 wherein the monitored process is a catalytic steam reforming process.

5. The method of claim 1 wherein said resistance is monitored across a single pellet of catalyst, whereby an exceedingly rapid indication of carbon formation is obtained.

6. The method of claim 5 wherein the monitored process is a catalytic steam reforming process.

7. The process of claim 4 wherein said resistance is monitored by detecting changes in current flow through the catalyst and said changes in current flow are employed to signal a control means for controlling the steam/carbon ratio in the process to prevent carbon deposition on said catalyst.

8. The process of claim 1 wherein said process is selected from the group consisting of steam reforming, town gas manufacturing and hydrogen generation.

9. The process of claim 1 wherein said process is steam reforming.

References Cited

UNITED STATES PATENTS

| | | | |
|---|---|---|---|
| 2,753,246 | 7/1956 | Shields et al. | |
| 2,984,542 | 5/1961 | Kleiber | 23—230 XR |
| 2,994,821 | 8/1961 | Dravnieks. | |
| 3,027,238 | 3/1962 | Watkins | 48—214 XR |
| 3,116,979 | 1/1964 | Kapff | 23—230 XR |
| 3,414,382 | 12/1968 | Kapff et al. | |

MORRIS O. WOLK, Primary Examiner

R. E. SERWIN, Assistant Examiner

U.S. Cl. X.R.

23—212, 230, 288.3; 324—65, 71